Patented Mar. 7, 1944

2,343,772

UNITED STATES PATENT OFFICE 2,343,772

GEOCHEMICAL PROSPECTING

Leo Horvitz, Houston, Tex., assignor to Esme E. Rosaire, Houston, Tex.

No Drawing. Application November 18, 1939, Serial No. 305,171

2 Claims. (Cl. 23—230)

The present invention relates to a method of geochemical prospecting and particularly to that method in which samples of soil are collected in a systematic manner over an area to be investigated, and examined for their content of soil wax, as defined in my co-pending application Serial No. 263,750, filed March 23, 1939. This application is a continuation in part of my co-pending application Serial No. 290,201, filed August 15th, 1939, and entitled Geochemical prospecting.

In my co-pending application Serial No. 290,201, I have described the determination of a correction factor to be applied to results obtained by analyzing soil samples for hydrocarbons and wax, and other substances. This correction factor was based on relative sorptivity of soil. I have now found that this correction factor is only of secondary importance with respect to the analysis of soil samples for their content of gaseous hydrocarbons, but that it is of considerably more importance in the analysis of soil samples for their content of soil wax. I have found further that in connection with the latter type of analyses the correction factor is not important because of relative sorptivity of the soil, but because of the different natures of clay and sand, respectively.

Soil wax which is obtained in the soil analyses described in my applications above referred to is apparently formed in the soil by reason of a multiplicity of reactions involving hydrocarbon gases issuing from a petroleum deposit. These reactions probably include oxidation and polymerization, and are naturally accelerated by the presence of catalysts. My investigations have demonstrated that because of the greater content of these catalytic substances in clayey soils, these waxes are found in much greater abundance in such soils than in sandy soils.

The principal object of the present invention, therefore, is the provision of a method for geochemical prospecting in which soil samples are systematically collected and analyzed for soil wax characterized by the fact that the soil wax found is related to the clay content of the soil sample examined.

The present invention may be carried out in a number of ways. One of these is to subject the soil sample to the usual treatment for the recovery therefrom of soil wax, described in my co-pending application Serial No. 263,750, and including an initial purification of the soil sample with a solvent, such as admixed carbon tetrachloride and acetone, followed by acidizing of the soil and a second extraction with a solvent, such as carbon tetrachloride, for the recovery of the wax. The soil sample is then subjected to lixiviation with water followed by settling and decantation. This series of steps when repeated on the residue after each decantation will result in the separation of the sand from the clay particles in the soil. By drying the final residue of sand and weighing it, or measuring its volume, and subtracting its weight or volume from the weight or volume of the total sample, the weight or volume of the clay in the sample may be ascertained. The amount of wax recovered is then divided by the weight or volume of the clay in the sample, whichever may be selected as the standard. It is important, of course, that in all cases the weight or volume of the clay be used so that there will be a uniform standard.

Another way of carrying out the present invention is to dry the soil sample, pulverize it or break it up into particles, and then subject it to sieving with a sieve of a mesh such that the sand particles will not pass through. That portion of the sample, which passes through the sieve, say for example, a 200 mesh sieve, is then subjected to the treatment briefly mentioned above for the recovery of soil wax. The amount of wax recovered is then related to the weight of the soil sample which is subjected to the actual wax recovery steps; that is, to the weight which passed through the sieve. In other words, the amount of wax recovered from any given sample is divided by the amount of the soil sample, which was actually subjected to the steps for the recovery of the wax.

The procedure last described is particularly advantageous regardless of the nature of the constituent which is sought in the soil sample. Its merit lies in the fact that it standardizes the soil samples and eliminates the step for making corrections based on relative sorptivity. More especially this sieving procedure is particularly desirable when the samples are analyzed for inorganic constituents, although it has the merit heretofore mentioned when the soil samples are analyzed for gaseous hydrocarbons or other gases. It is to be understood that the general application of this method of preparing a sample for analysis to all types of analysis is part of the present invention.

While I have described two ways in which the determination of soil wax in soil samples can be related to the clay content of the soil sample, I wish it to be understood that my invention is not restricted to these two ways but embraces all methods for determining the clay content of a soil sample in order that the wax recovered therefrom may be related to it.

The nature and objects of the present invention having been thus described, what is claimed as new and useful and is desired to be secured by Letters Patent is:

1. In the method of geochemical prospecting according to which soil samples are systematically recovered over an area to be investigated and subjected to a treatment for the recovery therefrom of soil wax, the step which comprises subjecting the sample to a mechanical separation step for the separation of the clay contained therein from the sand and analyzing only the clay for soil wax, whereby the soil wax may be expressed in terms of unit quantity of clay.

2. In the method of geochemical prospecting according to which soil samples are systematically recovered over an area to be investigated and subjected to a treatment for the determination therein of the quantity of a constituent significant of the existence of subsurface deposits, the steps of separating the clay from the sand in the sample and analyzing the clay portion for the aforesaid constituent.

LEO HORVITZ.